(12) United States Patent
Fife et al.

(10) Patent No.: US 10,274,913 B2
(45) Date of Patent: Apr. 30, 2019

(54) VARIABLE LENGTH SELF-LOCKING LIFELINE SYSTEM

(71) Applicant: The Boeing Company, Chicago, IL (US)

(72) Inventors: Matthew E. Fife, Everett, WA (US); Paul M. Sewell, Monroe, WA (US); Jonathan B. Creed, Everett, WA (US)

(73) Assignee: The Boeing Company, Chicago, IL (US)

( * ) Notice: Subject to any disclaimer, the term of this patent is extended or adjusted under 35 U.S.C. 154(b) by 369 days.

(21) Appl. No.: 15/194,085

(22) Filed: Jun. 27, 2016

(65) Prior Publication Data

US 2017/0368387 A1 Dec. 28, 2017

(51) Int. Cl.
*A62B 35/00* (2006.01)
*G05B 15/02* (2006.01)

(52) U.S. Cl.
CPC .......... *G05B 15/02* (2013.01); *A62B 35/0075* (2013.01)

(58) Field of Classification Search
CPC ... G05B 9/02; A62B 35/0043; A62B 35/0081; A62B 35/04; A62B 35/0075
See application file for complete search history.

(56) References Cited

U.S. PATENT DOCUMENTS

2015/0014092 A1* 1/2015 Blaise ............... A62B 35/0043
182/5
2017/0374436 A1* 12/2017 Awiszus ................ A62B 9/00

OTHER PUBLICATIONS

DBI Sala Fall Protection Products, 6' Web Lanyard (1231106) [online]. ITI Resources [retrieved on Jun. 24, 2016]. Retrieved from the Internet: <URL:http://fall-protection-products.com/dbi-sala/sku-1231106>.
DBI Sala Fall Protection Products, 11' Ultra-Lok Stainless Self Retracting Lifeline (3103108) [online]. ITI Resources [retrieved on Jun. 24, 2016]. Retrieved from the Internet: <URL:http://fall-protection-products.com/dbi-sala/sku-3103108>.

* cited by examiner

*Primary Examiner* — Changhyun Yi
(74) *Attorney, Agent, or Firm* — Haynes and Boone, LLP

(57) ABSTRACT

Systems and methods according to one or more embodiments are provided for a variable length self-locking lifeline system that prevents a user from falling off an elevated surface. In one example, a variable length self-locking lifeline system includes a processor and a lanyard. The lanyard is coupled between an anchor point and a user. One or more sensors determine, in real time, a current length and orientation of the lanyard as the lanyard responds to a user moving on an elevated surface. The processor is configured to trigger a locking mechanism to selectively lock the lanyard from further extension when a determined current length and current orientation exceeds a predefined safety perimeter of the elevated surface.

20 Claims, 7 Drawing Sheets

VARIABLE LENGTH SELF-LOCKING LIFELINE SYSTEM

TECHNICAL FIELD

The present invention relates generally to lifeline systems and, more particularly, for example, to a processor controlled variable length self-locking lifeline system.

BACKGROUND

Lifeline systems are used in various workplace environments to protect workers from accidental falls from elevated locations such as large scale assembly facilities, aviation maintenance platforms, and building construction and maintenance platforms. Such existing lifeline systems are often implemented as fall arrest systems or fall restraint systems.

Conventional fall arrest systems are designed to break a fall to prevent the user from reaching the lower surface. Such systems typically include a self-retracting lanyard (SRL). If a user begins to fall, the system may detect the falling movement and automatically retract to stop the fall before the user reaches the surface below. Unfortunately, such systems often require the user to move through a minimum deceleration distance before the arresting action occurs.

Conventional fall restraint systems are designed to prevent a user from actually reaching an edge of the elevated surface to prevent a fall and potential injury. However, such systems typically utilize fixed length lanyards which must be repeatedly exchanged for longer or shorter lengths if the perimeter of the elevated area is non-uniform relative to the system's anchor point, thus inconveniencing the user.

SUMMARY

Systems and methods are disclosed herein in accordance with one or more embodiments that provide an improved approach to a lifeline system that provides a variable length self-locking lanyard to obviate the need to replace various fixed length lanyards when working on an elevated surface with multiple edges with different lengths to each edge. In some embodiments, a variable length self-locking lifeline system is implemented with a processor and a self-retracting lanyard (SRL). The lanyard is be coupled between an anchor point and a user. In one example, one or more sensors detect a current length and orientation of the lanyard as the lanyard responds to a user moving on an elevated surface. The processor is configured to selectively trigger a locking mechanism to lock the lanyard from further extension when a determined current length and orientation equals and/or exceeds a predefined safety perimeter of the elevated surface.

In one embodiment, a system includes a lanyard configured to be coupled between an anchor point and a user, wherein the lanyard is configured to extend in response to a user's movement within an area; a first sensor configured to determine a current extended length of the lanyard; a second sensor configured to determine a current orientation of the lanyard relative to the anchor point; a memory configured to store information identifying a predefined safety perimeter associated with the area; a processor configured to determine whether the safety perimeter is exceeded using the determined length and the determined orientation; and a mechanism configured to selectively lock the lanyard in response to the determination by the processor to prevent further extension of the lanyard.

In another embodiment, a method includes extending, in response to a user's movement within an area, a lanyard configured to be coupled between an anchor point and a user; determining, by a first sensor, a current extended length of the lanyard; determining, by a second sensor, a current orientation of the lanyard relative to the anchor point; storing, by a memory, information identifying a predefined safety perimeter associated with the area; determining, by a processor, whether the safety perimeter is exceeded using the determined length and the determined orientation; and selectively locking the lanyard in response to the determination by the processor to prevent further extension of the lanyard.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

Various implementations of a variable length self-locking lifeline system are provided. A variable length self-locking lifeline system includes a lanyard coupled between an anchor point and a user. The lanyard may extend and retract in response to the user's movements on the elevated surface, for example, such as an elevated surface with an irregular (e.g., non-uniform) perimeter including multiple edges with different lengths to each edge. The variable length self-locking lifeline system operates to limit a user's movement on the elevated surface to prevent the user from exceeding a predefined safety perimeter identified within the elevated surface. Thus, the variable length self-locking lanyard provides a user the ability to safely change positions while still attached to the system without the need to move back to the anchor point to change fixed lanyard lengths when working at a different location on the elevated work surface. Additionally, there is no excess lanyard length and thus no inconvenience of moving excess lanyard from the work area.

In various embodiments, a variable length self-locking lifeline system includes multiple sensors to determine a current extended length and orientation of the lanyard in response to the user's movement. In some embodiments, a first sensor is provided as a line sensor to determine, in real-time, a current extended length of the lanyard. In some embodiments, a second sensor is provided as a compass sensor implemented as a micro electrical mechanical (MEMS) sensor to determine, in real-time, a current azimuth angle (e.g., a current orientation) of the lanyard.

In some embodiments, a memory is included to store the predefined safety perimeter information. In some embodiments, the predefined safety perimeter information includes a plurality of azimuth angles and corresponding horizontal maximum lengths stored as a table in memory. A processor is included to determine whether the safety perimeter is exceeded using the determined current length and the determined current orientation.

In various embodiments, the processor is configured to trigger a mechanism to selectively lock the lanyard to prevent further extension of the lanyard when the predefined safety perimeter is exceeded. In this regard, the variable length self-locking lifeline system prevents a user from reaching an edge of the elevated surface and a potential injury from a fall.

Figure 1:
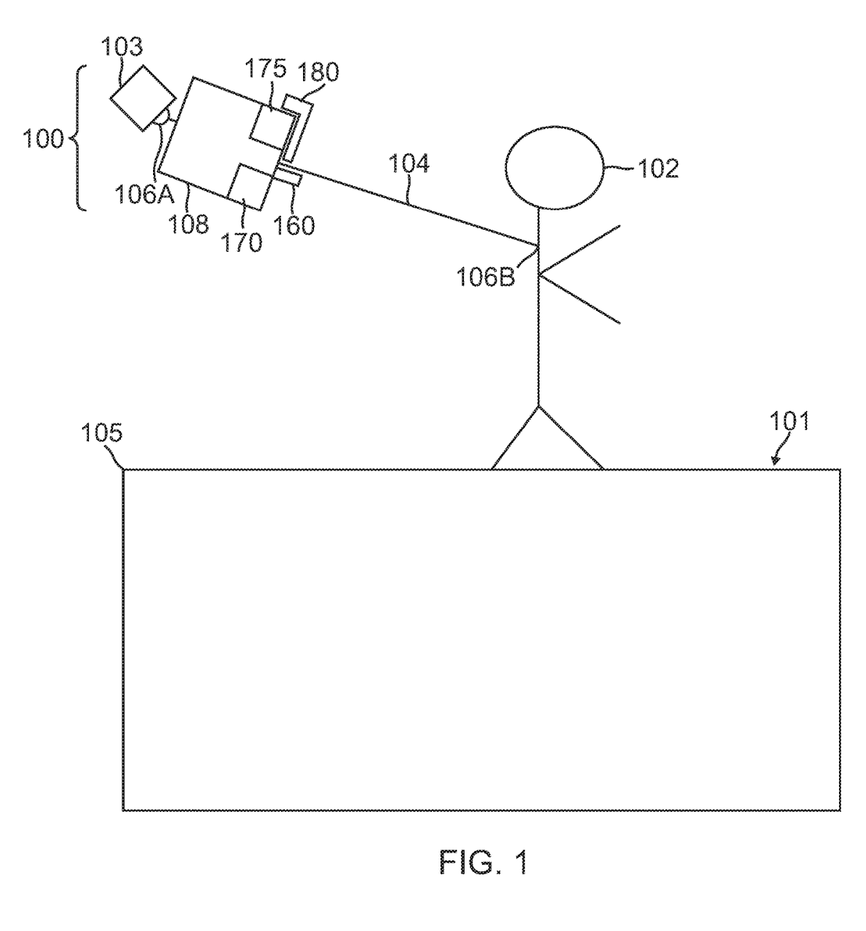
FIG. 1 illustrates a user attached to a variable length self-locking lifeline system in accordance with an embodiment of the disclosure.

FIG. 1 illustrates a user 102 attached to a variable length self-locking lifeline system 100 in accordance with an embodiment of the disclosure. System 100 is a safety apparatus capable of keeping a user 102 safe while moving about on elevated surface 101. In this regard, system 100 operates to limit a user's movement beyond a predefined safety perimeter 105. In some embodiments, system 100 is mechanically coupled at a lanyard coupling 106 to an anchor point 103. In some embodiments, anchor point 103 is affixed to a rigid structure located above an edge of elevated surface 101. In other embodiments, anchor point 103 is mechanically coupled to a rigid structure overhead of elevated surface 101. In yet another embodiment, anchor point 103 is mechanically coupled to elevated surface 101. In all embodiments, a certified anchor point 103 is located at a predefined distance from elevated surface 101.

System 100 may include a lanyard 104 coupled between anchor point 103 at lanyard coupling 106 and user 102. Lanyard 104 may be implemented as a flexible line of rope, wire rope or flat strap which has a connector at each end for connecting to user 102 and anchor point 103. In various embodiments, lanyard 104 is coupled to user 102 at a predefined distance above elevated surface 101. For example, in some embodiments, lanyard 104 is coupled to user 102 at a distance five feet above elevated surface 101. However, in other embodiments, lanyard 104 may be coupled to user 102 at a distance less than or greater than five feet above elevated surface 101.

In some embodiments, lanyard 104 is a self-retracting lanyard (SRL) 104. In this regard, as user 102 move around on elevated surface 101, lanyard 104 selectively extends and/or retracts in response to user 102 movements. Significantly, lanyard 104 is maintained in tension between user 102 and anchor point 103. In some embodiments, lanyard 104 is mechanically secured within housing 108.

System 100 may include a line sensor 160, a compass 170, and an inertial measurement unit 175. In some embodiments, line sensor 160, compass 170, and inertial measurement unit are each mechanically coupled to housing 108 of system 100. Line sensor 160, compass 170, and inertial measurement unit 175 are preferably implemented to provide continuous determination of user 102 relative to predefined safety perimeter 105 on elevated surface 101. In this regard, line sensor 160 determines a current extended length of lanyard 104 as lanyard 104 selectively extends and retracts as user 102 moves about on elevated surface 101. Line sensor 160 may communicate with a processor (e.g., such as processor 210 of FIG. 2) to provide real-time current length measurement information for lanyard 104.

In some embodiments, compass 170 may be implemented as an integrated circuit sensor (e.g., such as a magnetic field sensors) to provide processor 210 with a real-time pointing direction of lanyard 104 relative to anchor point 103. In this regard, processor 210 may utilize real-time current length measurement information provided by line sensor 160 and pointing direction of lanyard 104 provided by compass 170 to determine a real-time orientation of user 102 relative to predefined safety perimeter 105, as discussed further herein.

Figure 5:
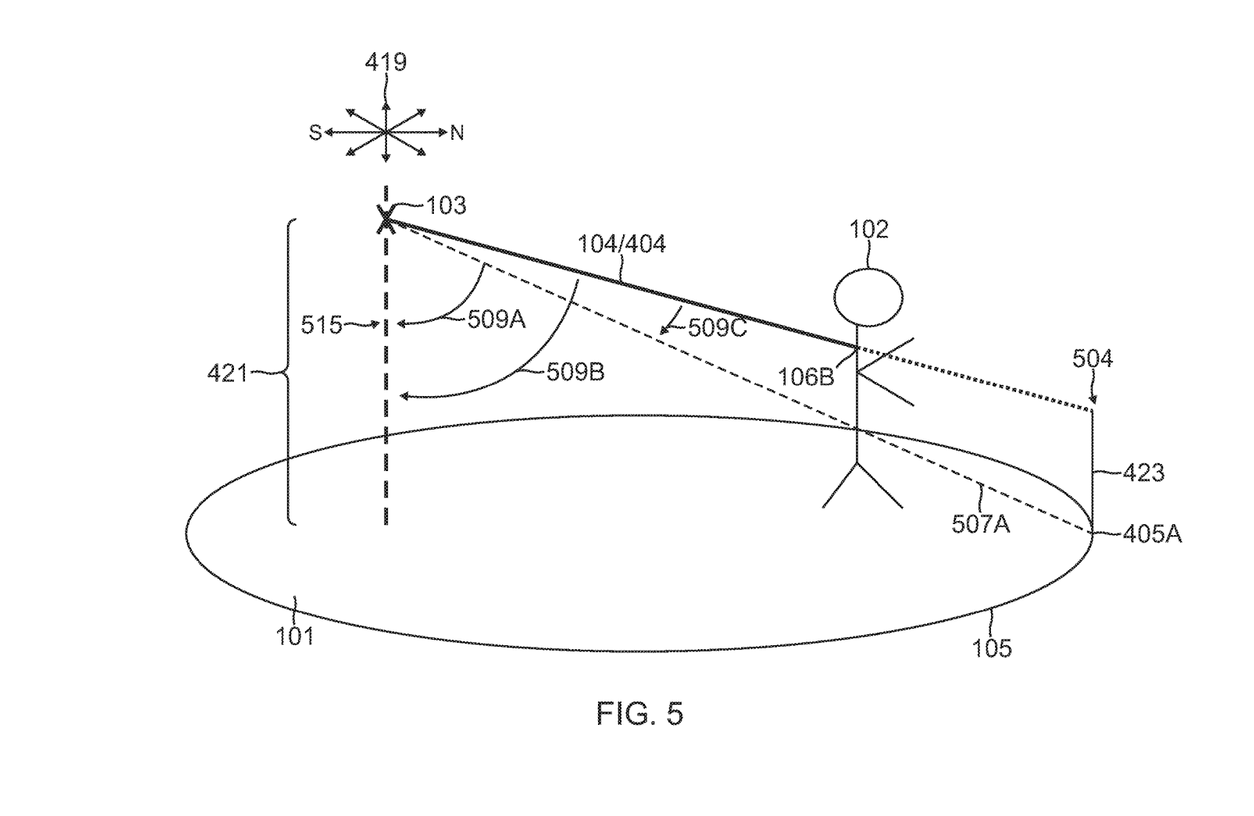
FIG. 5 illustrates a technique of operating a variable length self-locking lifeline system using inclination angles and maximum lengths in accordance with an embodiment of the disclosure.

In some embodiments, inertial measurement unit 175 may be used to provide a vertical inclination angle of lanyard 104 (e.g., such as vertical inclination angle 509B of FIG. 5). Vertical inclination angle 509B provides, in part, another embodiment of determining a real-time orientation of user 102 relative to predefined safety perimeter 105, as discussed further herein. Furthermore, inertial measurement unit 175 may be used to determine a pointing direction of lanyard 104, as discussed further herein.

In various embodiments, system 100 includes a locking mechanism 180. Locking mechanism 180 may be implemented to receive commands from processor 210 to selectively lock lanyard 140 when, for example, determined current length of lanyard 104 is equal to and/or exceeds predefined safety perimeter 105. In this regard, locking mechanism 180 may be implemented as one of various types of linear actuators such as a mechanical, a hydraulic, and/or an electro-mechanical actuator to apply a lateral force to lanyard 104 to prevent lanyard 104 from further extension.

System 100 provides for a versatile safety apparatus to prevent falls off elevated surfaces with multiple edges. In this regard, system 100 may sense a current length and orientation of lanyard 104 and provide real-time restraint without the need to replace fixed length lanyards 104 as user 102 moves to a different location on elevated surface 101.

Figure 2:
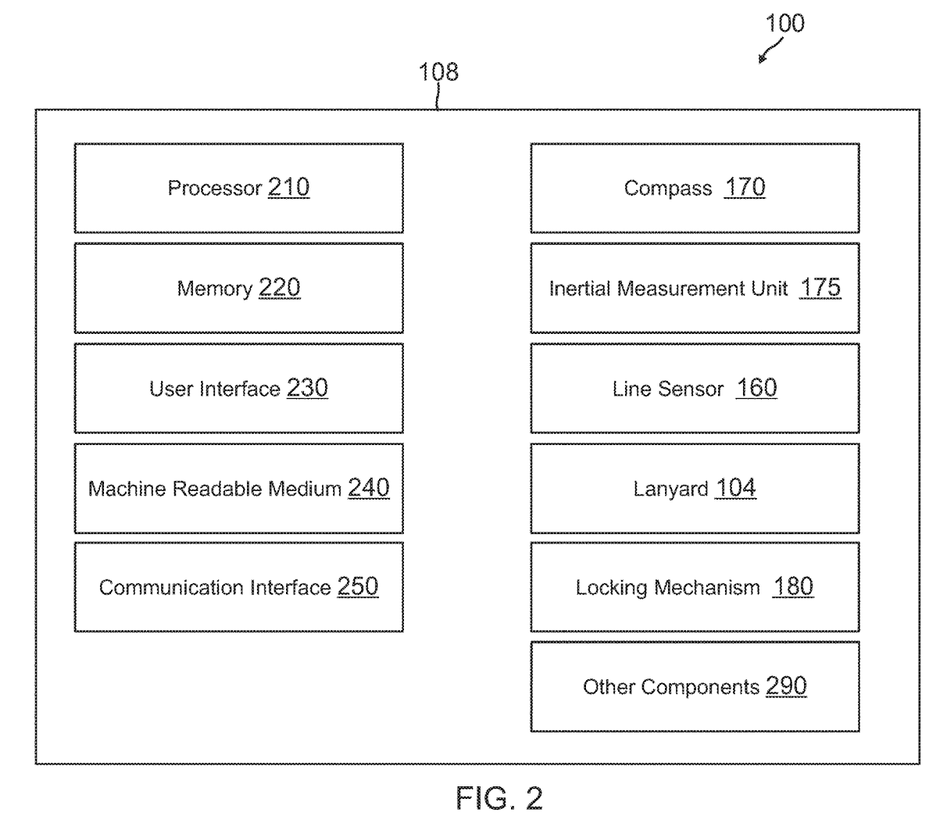
FIG. 2 illustrates a block diagram of a variable length self-locking lifeline system in accordance with an embodiment of the disclosure.

FIG. 2 illustrates a block diagram of a variable length self-locking lifeline system 100 in accordance with an embodiment of the disclosure. User 102 may be coupled to system 100 to prevent a fall from an edge of elevated surface 101. In the embodiment illustrated in FIG. 2, system 100 includes a processor 210, a memory 220, a user interface 230, a communication interface 250, a line sensor 160, a compass 170, an inertial measurement unit 175, and a locking mechanism 180.

Processor 210 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or or any other appropriate combination of processing device and/or memory to execute instructions to perform any of the various operations described herein. Processor 210 is adapted to interface and communicate with components 220, 230, 250, 160, 170, 175, and 180 to perform method and processing steps as described herein.

Memory 220 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, memory 220 is adapted to store information identifying predefined safety perimeter 105 associated with elevated surface 101.

In various embodiments, it should be appreciated that processing operations and/or instructions may be integrated in software and/or hardware as part of processor 210, or code (e.g., software or configuration data) which may be stored in memory 220. Embodiments of processing operations and/or instructions disclosed herein may be stored by a machine readable medium 240 in a non-transitory manner (e.g., a memory, a hard drive, a compact disk, a digital video disk, or a flash memory) to be executed by processor 210 (e.g., logic or processor-based system) to perform various methods disclosed herein.

User interface 230 includes any general interface for a user input and/or interface device having one or more user actuated components, such as one or more push buttons, slide bars, rotatable knobs or a keyboard, that are adapted to generate one or more user actuated input control signals.

In various embodiments, communication interface 250 may include one or more wired or wireless communication interfaces, such as an Ethernet connection, a wireless local area network (WLAN) component based on the IEEE 802.11 standards, a wireless broadband component, mobile cellular component, or various other types of wireless communication interfaces including radio frequency (RF), microwave frequency (MWF), and/or infrared frequency (IRF) components adapted for communication with a network. As such, communication interface 250 may include an antenna coupled thereto for wireless communication purposes. In other embodiments, communication interface 250 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

Lanyard 104 may be implemented as a stranded nylon rope, a flat synthetic web fabric, and/or a stainless steel cable which has a connector at each end for connecting to user 102 and anchor point 103. In some embodiments, lanyard 104 incorporates an internal energy absorbing material or design to dissipate energy imposed on user 102 during a fall. In some embodiments, lanyard 104 is implemented as a self-retracting lanyard (SRL).

Line sensor 160 may be implemented as one of various types of sensors to measure an extended length of lanyard 104. For example, line sensor 160 may be implemented as a mechanical rolling sensor (e.g., a measuring wheel encoder) where lanyard 104 is contacted by a mechanical wheel including an encoder device to measure wheel rotation as lanyard 104 selectively extends and retracts. Line sensor 160 may be implemented as a non-contact sensor incorporating laser and/or optical technology including electronic circuitry to measure an extended length of lanyard 104. In one embodiment, line sensor 160 may be implemented as an optical sensor to read periodic markings on lanyard 104 to determine a current extended length of lanyard 104. In all embodiments, line sensor 160 communicates with processor 210 to provide determined lanyard length measurement information when requested by processor 210.

In some embodiments, compass 170 (e.g., compass sensor 170) is implemented as an integrated circuit sensor (e.g., a magnetic field sensor) to provide a real-time pointing direction of lanyard 104. In this regard, compass sensor 170 may be implemented as a micro electromechanical system (MEMS) on a printed circuit board to communicate with processor 210. In some embodiments compass sensor 170 may be implemented as a packaged and sealed integrated circuit assembly. Compass 170 may provide pointing direction of lanyard 104 when requested by processor 210. In some embodiments, compass 170 may provide an azimuth angle expressed in degrees in a range from zero degrees to three hundred sixty degrees. In other embodiments, compass 170 may provide a cardinal direction of lanyard 104. In other embodiments, compass 170 may be implemented as part of inertial measurement unit (IMU) 175. In this regard, IMU 175 may include a magnetometer used to provide processor 210 with pointing direction of lanyard 104. In various embodiments, compass 170 is implemented with one or more accelerometers to provide pitch and roll compensation for sensor measurements when compass 170 is tilted.

Significantly, processor 210 receives real-time current length measurement information from line sensor 160 and pointing direction information from compass 170 to determine a real-time orientation of lanyard 104. Furthermore, processor 210 may compare real-time length and orientation information of lanyard 104 to predefined safety perimeter 105 to lock lanyard 104 and prevent a fall from elevated surface 101.

In some embodiments, inertial measurement unit (IMU) 175 is implemented as a MEMS sensor with one or more accelerometers and/or one of more gyroscopes to determine a vertical inclination angle (e.g., such as vertical inclination angle 509B of FIG. 5) of lanyard 104 relative to a vertical plane (e.g., such as plane 515 of FIG. 5). Inclination angle 509B may be communicated to processor 210 to provide processor 210 with a real-time orientation of lanyard 104. In some embodiments, IMU sensor 175 may also provide a current pointing direction of lanyard 104, as discussed herein.

Locking mechanism 180 may be implemented as an actuator that, when triggered (e.g., by a command) by processor 210, selectively locks lanyard 104 to prevent further extension of lanyard 104. In some embodiments, locking mechanism 180 may be implemented, for example, as an electro-mechanical linear actuator including a rotary device such as a lead screw and a motor to drive the lead screw along an axis perpendicular to lanyard 104. In some embodiments, a locking mechanism is implemented as a hydraulic actuator. Other implementations of locking mechanism are possible in other embodiments.

Other components 290 may include an antenna 290 implemented as a wireless communication antenna. In this regard, antenna 290 provides wireless communication signals between an external device and processor 210 for transmitting and receiving information and data, as discussed herein.

Figure 3:
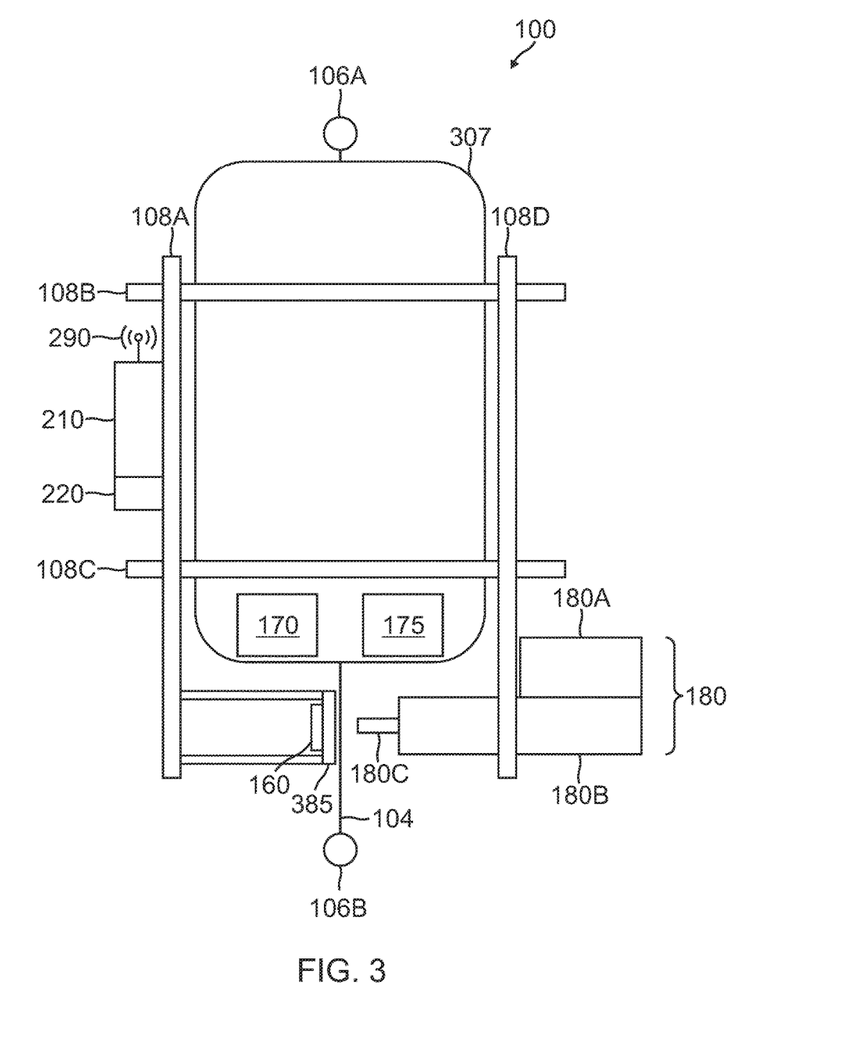
FIG. 3 illustrates a front elevation view of a variable length self-locking lifeline system in accordance with an embodiment of the disclosure.

FIG. 3 illustrates a front elevation view of a variable length self-locking lifeline system 100 in accordance with an embodiment of the disclosure. As illustrated in FIG. 3, system 100 may be implemented as lanyard 104 (e.g., such as a self-retracting lanyard) secured to housing 108. In some embodiments, housing 108 may be implemented as a housing frame 108A-D, as illustrated in FIG. 3. Lanyard couplings 106A-B may be mechanically secured to lanyard 104 to provide for coupling lanyard 104 to anchor point 103 at lanyard coupling 106A and user 102 at lanyard coupling 106B.

In some embodiments, processor 210 and memory 220 is mechanically coupled to housing 108. Processor 210 may be electrically coupled to memory 220 to provide for power, data, and/or control signal interfaces between processor 210 and memory 220. Furthermore, processor 210 may be electrically coupled to antenna 290 to facilitate wireless communication to and from external devices. In some embodiments, processor 210 is electrically coupled to line sensor 160, compass 170, and IMU 175 to receive data and provide control signals.

In some embodiments, line sensor 160 is positioned within proximity to lanyard 104 to determine a current length of lanyard 104 as user 102 moves about elevated surface 101. In this regard, line sensor 160 may be positioned in relation to lanyard 104 to sense lanyard 104 as it is extracted and/or retracted. Line sensor 160 is mechanically secured to housing 108. In some embodiments, compass 170 and IMU 175 are mechanically secured to a lanyard body 307. Compass 170 and IMU 175 are positioned on lanyard body 307 to provide orientation information of lanyard 104, as discussed herein. In other embodiments, compass 170 and/or IMU 175 are mechanically secured to housing 108 and positioned on housing 108 to provide orientation information of lanyard 104.

In some embodiments, locking mechanism 180 may include an electric motor 180A, an actuator housing 180B, and an actuator 180C coupled to actuator housing 180B. Locking mechanism 180 may be electrically coupled to processor 210. Processor 210 may provide electrical command signals to selectively trigger locking mechanism 180 to prevent lanyard 104 from further extension. In this regard, actuator 180C may drive into lanyard 104 and press lanyard 104 against lanyard support platform 385 to lock lanyard 104 (e.g., stop lanyard 104 at its current length). In some embodiments, locking mechanism 180 is configured to lock lanyard 104 at loss of power to locking mechanism 180 and/or system 100. In some embodiments, locking mechanism 180 is configured to lock lanyard 104 at loss of communication interface 250. In various embodiments, locking mechanism 180 is reset when power and/or communication interface 250 is restored or by manual operation of user 102.

Figure 4A:
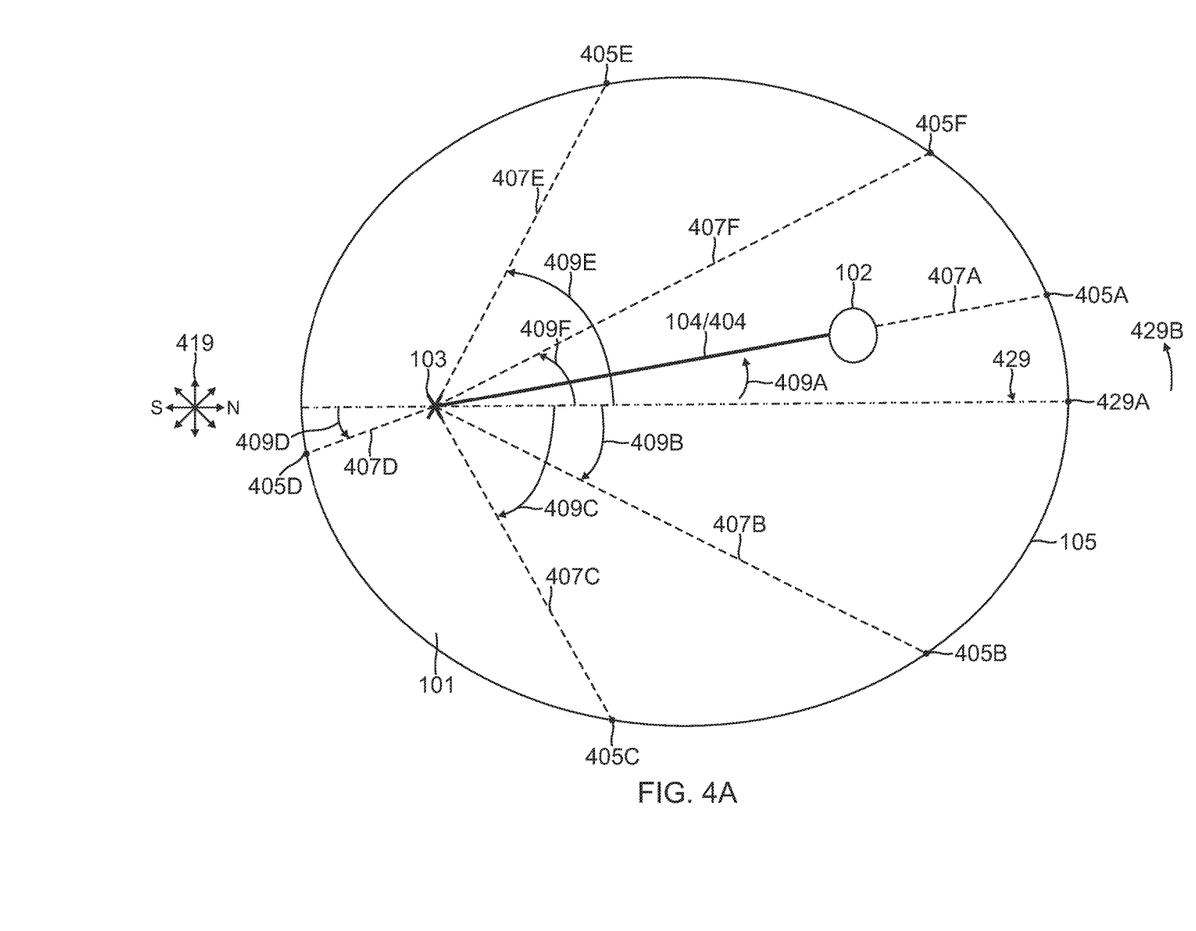
FIGS. 4A and 4B illustrate techniques of operating a variable length self-locking lifeline system using azimuth angles and maximum horizontal distances in accordance with embodiments of the disclosure.
Figure 4B:
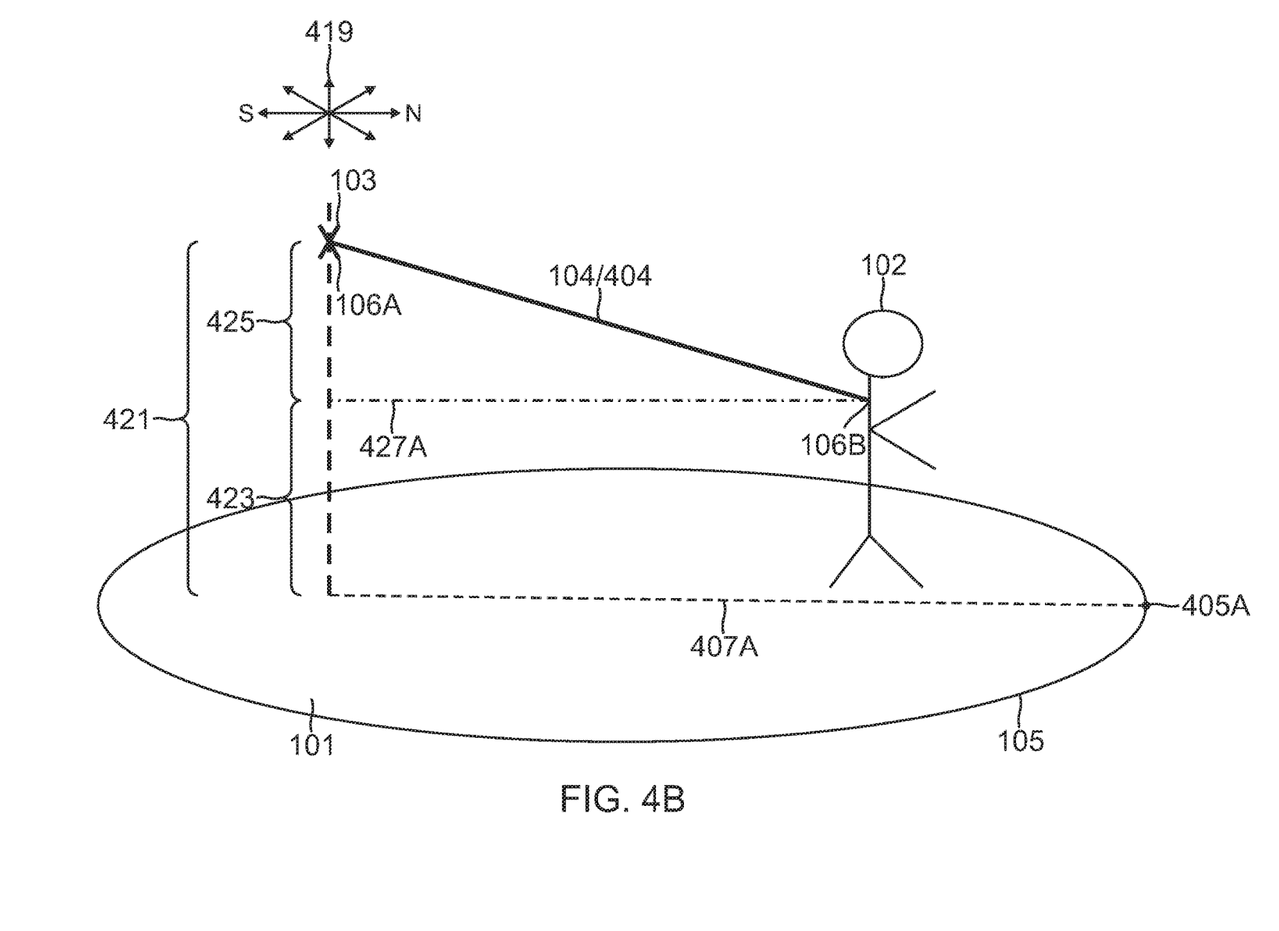

FIGS. 4A and 4B illustrate techniques of operating a variable length self-locking lifeline system 100 using azimuth angles 409 and maximum horizontal distances 407 in accordance with embodiments of the disclosure. FIG. 4A illustrates a technique of operating system 100 using azimuth angles 409. Predefined safety perimeter 105 includes a plurality of safety perimeter points 405A-F distributed about safety perimeter 105. A plurality of maximum horizontal distances 407A-F (e.g., horizontal distances 407A-F parallel to elevated surface 101) are provided between anchor point 103 and corresponding safety perimeter points 405A-F. An orientation of each maximum horizontal distance 407 is provided by a corresponding azimuth angle 409.

In some embodiments, azimuth angle 409 is measured by compass 170 and provided to processor 210 as a cardinal direction in accordance with compass coordinates 419. In other embodiments, azimuth angle 409 is provided by compass 170 to processor 210 as an azimuth angle provided in degrees. In this regard, zero degree azimuth angle is located at point 429A (e.g., such as due north in FIG. 4A) on axis 429 projected through anchor point 103. Azimuth angle increases in a counter clockwise direction around safety perimeter 105. In some embodiments, azimuth angle 409 is measured by IMU 175 and provided to processor 210 as a cardinal direction and/or azimuth angle 409. In this regard, maximum horizontal distances 407A-F provide a plurality of maximum lengths from anchor point 103 to safety perimeter 105 and corresponding angles 409A-F provide an orientation of corresponding maximum horizontal distances 407A-F.

FIG. 4B illustrates a technique of operating system 100 using maximum horizontal distances 407. As shown in FIG. 4B, lanyard 104 is coupled between anchor point 103 and user 102. Processes and methods described herein may be used to limit a user 102 movements within predefined safety perimeter 105. Predefined safety perimeter 105 is provided by a plurality of maximum horizontal distances 407 and a plurality of corresponding azimuth angles 409. For example, a maximum horizontal distance 407A is measured from a point perpendicular to anchor point 103 on elevated surface 101 to corresponding safety perimeter point 405A. Corresponding measured azimuth angle 409A provides an orientation of maximum horizontal distance 407A on elevated surface 101. Maximum horizontal distance 407A and corresponding azimuth angle 409A may be stored in memory 220 and provided to processor 210 for real-time processing, as discussed herein. In some embodiments, a plurality of maximum horizontal distances 407 and corresponding azimuth angles 409 associated with predefined safety perimeter 105 are stored in memory 220.

As user 102 moves within predefined safety perimeter 105, sensors 160, 170, and/or 175 provide processor 210 with lanyard 104 determined lanyard length 404 and current orientation information. Processor 210 may utilize sensor information to determine user 102 positions relative to anchor point 103. In one embodiment, processor 210 determines user 102 position using equation 1:

$$D_L^2 = (D_A - D_B)^2 + D_P^2 \qquad \text{(equation 1)}$$

Equation 1, using Pythagorean's theorem, provides that the square of a determined lanyard length 404 (e.g., such as $D_L$ in equation 1) equals the square of a vertical height 425 (e.g., such as $(D_A - D_B)$ in equation 1 where $D_A$ is element 421 and $D_B$ is element 423 in FIG. 4B) plus a current horizontal distance 427 (e.g., such as $D_P$ in equation 1).

Vertical height 425 (e.g., $(D_A - D_B)$ in equation 1) may be computed by subtracting a vertical height 423 from a vertical height 421. Vertical height 421 is the distance from elevated surface 101 to anchor point 103. Vertical height 421 of anchor point 103 is readily available for all certified anchor points 103 and vertical height 423 is the height from lanyard 104 coupling 106B attached to user 102 to elevated surface 101. In some embodiments, height 423 is five feet, however other heights 423 may be possible. Vertical height 421, 423, and 425 may be stored in memory 220 and used by processor 210 in the calculation of current horizontal distance 427. Equation 1 may be re-ordered into the form of equation 2 to compute current horizontal distance 427 (e.g., $D_P$):

$$D_P = \sqrt{D_L^2 - (D_A - D_B)^2} \qquad \text{(equation 2)}$$

Processor 210 provides for real-time processing of current horizontal distance 427 while user 102 moves about predefined safety perimeter 105. In some embodiments, processor 210, in real-time, compares current horizontal distance 427 to maximum horizontal distance 407A to determine if user 102 has exceeded safety perimeter 105. Processor 210 selectively triggers locking mechanism 180 to lock lanyard from further extension when current horizontal distance 427 equals maximum horizontal distance 407A. In other embodiments, when current horizontal distance 427 exceeds maximum horizontal distance 407A, processor 210 selectively triggers locking mechanism 180 to lock lanyard from further extension. In this regard, system 100 provides for user 102 to safely move about elevated surface 101 with multiple edges, and limits user's 102 movements to within predefined safety perimeter 105.

FIG. 5 illustrates a technique of operating a variable length self-locking lifeline system 100 using inclination angles 509 and maximum lengths 507 in accordance with an embodiment of the disclosure. FIG. 5 illustrates another embodiment used to limit a user's 102 movement within predefined safety perimeter 105. Predefined safety perimeter 105 is provided by a plurality of maximum lengths 507 and corresponding inclination angles 509. Maximum length 507A is measured from anchor point 103 to safety perimeter point 405A and stored in memory 220. Vertical height 421 (e.g., distance from elevated surface 101 to anchor point 103) is available, as discussed herein, and stored in memory 220. Furthermore, vertical height 423 (e.g., vertical height from coupling 106B of lanyard 104 at user 102 to elevated surface 101) is predefined, as discussed herein, and stored in memory. In some embodiments, vertical height 421, and vertical height 423 are provided directly to processor 210.

In some embodiments, processor 210 calculates a vertical inclination angle 509A from maximum length 507A to a projected plane 515 (e.g., projected plane 515 that is perpendicular to anchor point 103 and elevated surface 101). Processor 210 calculates angle 509A using equation 3:

$$\theta_1 = \cos^{-1}(D_A/D_F) \quad \text{(equation 3)}$$

Equation 3 provides that angle 509A (e.g., such as $\theta_1$ in equation 3) is equal to the inverse cosine of vertical height 421 (e.g., such as such as $D_A$ in equation 3) divided by maximum length 507A (e.g., such as $D_F$ in equation 3). In various embodiments, a plurality of maximum lengths 507 and corresponding inclination angles 509 associated with predefined safety perimeter 105 are provided to memory 220 and/or processor 210.

IMU sensor 175 may provide a vertical inclination angle 509B of lanyard 104 (e.g., relative to plane 515) in real-time as user 102 is moving about elevated surface 101. IMU sensor 175 may provide angle 509B to memory 220 and/or processor 210. Processor 210 provides for real-time processing to determine if predefined safety perimeter 105 is exceeded while user 102 moves about elevated surface 101. In this regard, processor 210 uses equation 4 to determine when to selectively trigger locking mechanism 180 to lock lanyard from further extension:

$$D_B^2 = D_L^2 + D_F^2 - 2 \cdot D_L \cdot D_F \cdot \cos(\theta_2) \quad \text{(equation 4)}$$

Equation 4 provides that vertical height 423 (e.g., such as $D_B$ in equation 4) squared equals the quantity determined lanyard length 404 (e.g., such as $D_L$ in equation 4) squared plus maximum length 507A (e.g., such as $D_F$ in equation 4) squared minus two times the quantity determined lanyard length 404 multiplied by maximum length 507A multiplied by cosine of angle 509C (e.g., such as angle $\theta_2$ of equation 4). Angle 509C is determined by subtracting determined vertical inclination angle 509B from vertical inclination angle 509A. Thus, when equation 4 is true (e.g., when lanyard 104 is extended to position 504), processor 210 selectively triggers locking mechanism 180 to lock lanyard from further extension.

Figure 6:
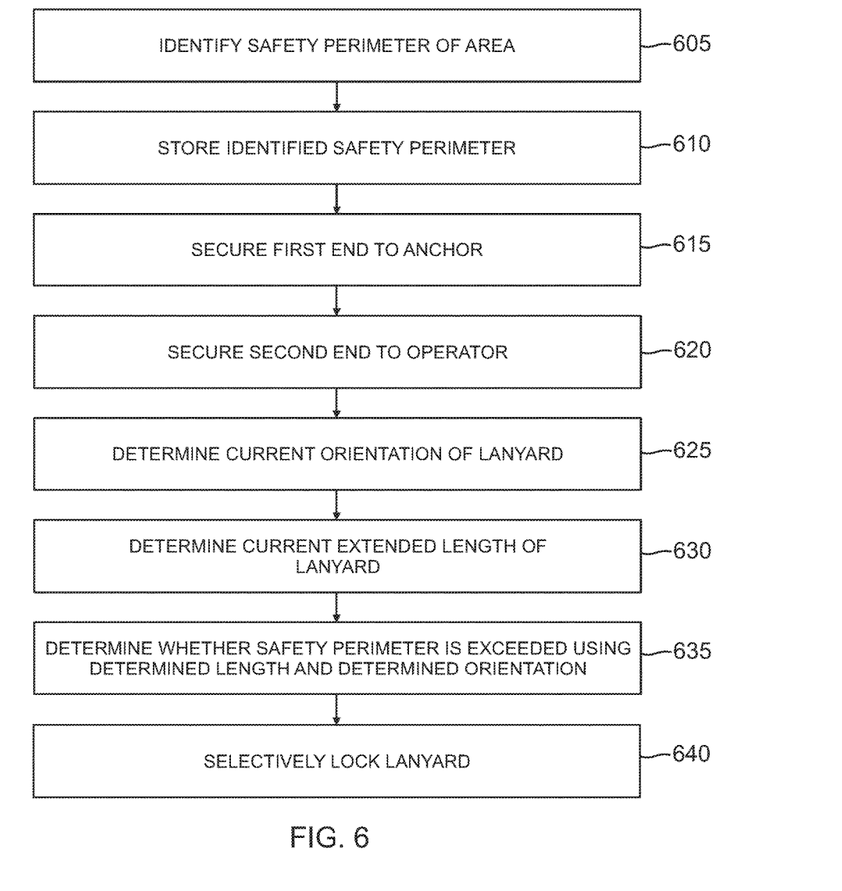
FIG. 6 illustrates a process of using a variable length self-locking lifeline system in accordance with an embodiment of the disclosure.

FIG. 6 illustrates a process of using a variable length self-locking lifeline system 100 in accordance with an embodiment of the disclosure.

In block 605, a safety perimeter 105 (e.g., predefined safety perimeter 105) surrounding an elevated surface 101 is identified. In some embodiments, elevated surface 101 may have multiple contours and multiple edges. In this regard, safety perimeter 105 is identified to provide a safe distance from edges of elevated surface 101.

In various embodiments, safety perimeter 105 is identified by a plurality of angles (e.g., such as angles 409 and 509) and corresponding maximum distances (e.g., such as 407 and 507). In some embodiments, safety perimeter is identified by a plurality of azimuth angles 409 (e.g., such as azimuth angles 409A-F of FIG. 4A) and corresponding maximum horizontal distances 407 (e.g., such as maximum horizontal distances 407A-F of FIG. 4A). Maximum horizontal distance 407 is measured from anchor point 103 to a point 405 on safety perimeter 105, as discussed herein. In some embodiments, anchor point 103 is a certified anchor point 103 and orientation information such as height and location are predefined. In this regard, anchor point 103 orientations (e.g., height and location) relative to elevated surface may be stored in memory 220 and provided to processor 210 for use in determining maximum horizontal distance 407.

In some embodiments, safety perimeter 105 is identified by a plurality of vertical inclination angles 509 and corresponding maximum lengths 507 associated with vertical inclination angles 509. In this regard, vertical inclination angles 509 extending from corresponding maximum lengths 507 to projected plane 515 may be calculated by processor 210, as discussed herein. Corresponding maximum lengths 507 is measured from anchor point 103 to predefined safety perimeter 105, as discussed herein.

In block 610, the predefined safety perimeter 105 is stored in memory 220. In this regard, the plurality of associations of azimuth angles 409 and corresponding maximum horizontal distances 407, and/or vertical inclination angles 509 and maximum lengths 507 is stored in memory 220 and available to processor 210 for processing operations. Table 1 provides an example of azimuth angles 409 and corresponding maximum horizontal distances 407 associated with predefined safety perimeter 105 as stored in memory 220.

TABLE 1

| Azimuth Angle (degrees) | Distance (feet) |
|---|---|
| 0 | 50 |
| 10 | 48 |
| 45 | 40 |
| 75 | 35 |
| . | . |
| . | . |
| . | . |
| 285 | 35 |
| 315 | 40 |
| 350 | 48 |

In block 615, lanyard coupling 106A secures lanyard 104 to anchor point 103. Furthermore, lanyard 104 pivotally rotates about anchor point 103 at lanyard coupling 106A in response to user 102 movements on elevated surface 101.

In block 620, lanyard coupling 106B may secure lanyard 104 to user 102. In this regard, coupling 106B may be attached to a harness worn by user 102. In some embodiments, coupling may be attached to user 102 at a distance of five feet from elevated surface, as discussed herein.

In block 625, in some embodiments, a current orientation is provided to processor 210 and/or memory 220 as current azimuth angle 409 of lanyard 104. In some embodiments, current azimuth angle 409 is provided by compass 170. In other embodiments, current azimuth angle 409 is provided by IMU 175. Current azimuth angle may be provided in degrees (e.g., such as from zero degrees at due north to three hundred sixty degrees increasing in a counterclockwise 429B from point 429A) and/or a cardinal direction, as discussed herein.

In some embodiments, a current orientation is provided to processor 210 as a current vertical inclination angle 509 (e.g., such as inclination angle 509C) of lanyard 104 relative to maximum length 507. Current vertical inclination angle 509C is calculated by subtracting a measured inclination angle 509B of determined lanyard length 404 provided by inertial measurement unit 175 from inclination angle 509A of maximum length 507A, as discussed herein.

In block 630, in some embodiments, a current extended length is provided as a current horizontal distance 427 from anchor point 103 to an end of lanyard 104 at lanyard coupling 106B. In this regard, current horizontal distance 427 is calculated using a measured determined lanyard length 404 (e.g., as measured by line sensor 106) and a measured vertical distance 425, as discussed herein. In some embodiments, current extended length is a determined lanyard length 404 measured by line sensor 106.

In block 635, a current extended lanyard length and current lanyard orientation is used to determine if predefined safety perimeter 105 is exceeded. Predefined safety perimeter 105 is identified by a plurality of angles and corresponding maximum distances associated with the angles, as discussed herein. In some embodiments, as described herein in relation to FIGS. 4A and 4B, a horizontal distance 427 and azimuth angle 409 is used. For example, current horizontal distance 427A is used in determining if maximum horizontal distance 407A associated with current azimuth angle 409A is exceeded.

In other embodiments, determined lanyard length 404 and inclination angle 509 is used to determine if predefined safety perimeter 105 is exceeded. In this regard, equation 4, as discussed herein, provides the calculation using determined lanyard length 404 and inclination angle 509 to determine if predefined safety perimeter 105 is exceeded.

In block 640, processor 210 may selectively trigger locking mechanism 180 to lock lanyard 104 from further extension when current extended length and orientation (e.g., current horizontal distance 427A and current azimuth angle 409A and/or determined lanyard length 404 and current vertical inclination angle 509) equals and/or exceeds predefined safety perimeter 105 of the elevated surface 101.

In view of the present disclosure, it will be appreciated that providing a variable length self-locking lifeline system in accordance with various embodiments set forth herein may provide for a user to safely move about on an elevated surface. In this regard, by sensing, in real time, a current extended length and current orientation of a lanyard coupled between an anchor point and a user while the user moves about on the elevated surface, determining, in real time, if a predefined safety perimeter has been exceeded, and selectively locking the lanyard when the safety perimeter is exceeded, a robust lifeline system is provided.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
   a lanyard configured to be coupled between an anchor point and a user, wherein the lanyard is configured to extend in response to the user's movement within an area;
   a first sensor configured to determine a current extended length of the lanyard;
   a second sensor configured to determine a current orientation of the lanyard relative to the anchor point;
   a memory configured to store information identifying a predefined safety perimeter associated with the area;
   a processor configured to determine whether the predefined safety perimeter is exceeded using the determined length and the determined orientation, and provide a command signal to lock the lanyard when the predefined safety perimeter is exceeded;
   a locking mechanism comprising an actuator configured to selectively lock the lanyard in response to the command signal received from the processor to prevent further extension of the lanyard; and
   wherein the information identifying the safety perimeter comprises associations between a plurality of angles and a plurality of corresponding maximum distances, the angles are azimuth angles of the lanyard, the maximum distances are maximum horizontal distances from the anchor point to the safety perimeter associated with the azimuth angles, the determined orientation is a current azimuth angle of the lanyard, and the processor is configured to compare a current horizontal distance from the anchor point to an end of the lanyard with the maximum distance associated with the current azimuth angle to determine whether the safety perimeter is exceeded.

2. The system of claim 1, wherein:
   the first and second sensors are mechanically coupled to the lanyard; and
   the second sensor comprises an inertial measurement unit (IMU).

3. The system of claim 1, wherein the mechanism is a linear actuator configured to apply a lateral force to the lanyard to lock the lanyard to prevent further extension.

4. The system of claim 1, wherein the lanyard is a self-retracting lanyard (SRL) comprising a stranded nylon rope, a flat synthetic web fabric, and/or a stainless steel cable.

5. The system of claim 1, wherein the lanyard is maintained in tension between the anchor point and the user.

6. The system of claim 1, further comprising a housing, wherein the lanyard and mechanism are mechanically coupled to the housing.

7. The system of claim 1, wherein the processor is a microcontroller.

8. The system of claim 1, wherein the first sensor is configured as a wheel encoder to measure displacement of a wheel in contact with the lanyard to determine the current extended length of the lanyard.

9. The system of claim 1, wherein the first sensor is configured as an optical sensor to read periodic markings on the lanyard to determine the current extended length of the lanyard.

10. A system comprising:
a lanyard configured to be coupled between an anchor point and a user, wherein the lanyard is configured to extend in response the user's movement within an area;
a first sensor configured to determine a current extended length of the lanyard;
a second sensor configured to determine a current orientation of the lanyard relative to the anchor point;
a memory configured to store information identifying a predefined safety perimeter associated with the area;
a processor configured to determine whether the predefined safety perimeter is exceeded using the determined length and the determined orientation, and provide a command signal to lock the lanyard when the predefined safety perimeter is exceeded;
a locking mechanism comprising an actuator configured to selectively lock the lanyard in response to the command signal received from the processor to prevent further extension of the lanyard; and
wherein the information identifying the safety perimeter comprises associations between a plurality of angles and a plurality of corresponding maximum distances, the angles are vertical inclination angles, the maximum distances are maximum lengths associated with the vertical inclination angles, the determined orientation is a current vertical inclination angle of the lanyard, and the processor is configured to compare the current extended length of the lanyard with the maximum distance associated with the current vertical inclination angle to determine whether the safety perimeter is exceeded.

11. The system of claim 10, wherein the lanyard is a self-retracting lanyard (SRL) comprising a stranded nylon rope, a flat synthetic web fabric, and/or a stainless steel cable.

12. The system of claim 10, further comprising an inertial measurement unit configured to provide the vertical inclination angles.

13. The system of claim 10, wherein the first sensor is configured as an optical sensor to read periodic markings on the lanyard to determine the current extended length of the lanyard.

14. The system of claim 10, wherein the first sensor is configured as a wheel encoder to measure displacement of a wheel in contact with the lanyard to determine the current extended length of the lanyard.

15. The system of claim 10, wherein the mechanism is a linear actuator configured to apply a lateral force to the lanyard to lock the lanyard to prevent further extension.

16. A method comprising:
extending, in response to a user's movement within an area, a lanyard configured to be coupled between an anchor point and the user;
determining, by a first sensor, a current extended length of the lanyard;
determining, by a second sensor, a current orientation of the lanyard relative to the anchor point;
storing, by a memory, information identifying a predefined safety perimeter associated with the area;
determining, by a processor, whether the predefined safety perimeter is exceeded using the determined length and the determined orientation;
selectively locking the lanyard in response to the determination by the processor to prevent further extension of the lanyard; and
wherein the information identifying the safety perimeter comprises associations between a plurality of angles and a plurality of corresponding maximum distances, the angles are azimuth angles of the lanyard, the maximum distances are maximum horizontal distances from the anchor point to the safety perimeter associated with the azimuth angles, the determined orientation is a current azimuth angle of the lanyard, and the determining whether the safety perimeter is exceeded comprises comparing, by the processor, a current horizontal distance from the anchor point to an end of the lanyard with the maximum distance associated with the current azimuth angle.

17. The method of claim 16, wherein:
the first and second sensors are mechanically coupled to the lanyard; and
the second sensor comprises an inertial measurement unit (IMU).

18. The method of claim 16, wherein the selectively locking comprises applying, by a linear actuator, a lateral force to the lanyard to lock the lanyard to prevent further extension.

19. The method of claim 16, wherein the lanyard is a self-retracting lanyard (SRL).

20. The method of claim 16, wherein the lanyard is maintained in tension between the anchor point and the user.

* * * * *